US008711697B1

(12) United States Patent
Orr et al.

(10) Patent No.: US 8,711,697 B1
(45) Date of Patent: Apr. 29, 2014

(54) METHOD AND APPARATUS FOR PRIORITIZING DATA TRANSFER

(75) Inventors: Michael Orr, Sunnyvale, CA (US);
Nafea Bshara, San Jose, CA (US);
Tsahi Daniel, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 76 days.

(21) Appl. No.: 13/529,920

(22) Filed: Jun. 21, 2012

Related U.S. Application Data

(60) Provisional application No. 61/500,003, filed on Jun. 22, 2011.

(51) Int. Cl.
*H04L 12/26* (2006.01)
(52) U.S. Cl.
USPC ....................................................... 370/235
(58) Field of Classification Search
None
See application file for complete search history.

(56) References Cited

U.S. PATENT DOCUMENTS

| 6,721,273 | B1* | 4/2004 | Lyon | 370/235 |
|---|---|---|---|---|
| 7,505,468 | B1* | 3/2009 | Wang | 370/412 |
| 8,520,522 | B1* | 8/2013 | Goldman et al. | 370/235 |
| 2005/0083837 | A1* | 4/2005 | Maehara et al. | 370/229 |
| 2005/0088969 | A1* | 4/2005 | Carlsen et al. | 370/229 |
| 2005/0281282 | A1* | 12/2005 | Gonzalez et al. | 370/422 |
| 2008/0259798 | A1* | 10/2008 | Loh et al. | 370/235 |
| 2010/0265821 | A1* | 10/2010 | Schmidt et al. | 370/230 |
| 2012/0327951 | A1* | 12/2012 | Sgouros et al. | 370/412 |

* cited by examiner

*Primary Examiner* — Anh-Vu Ly

(57) ABSTRACT

In accordance with an embodiment, there is provided a network component, comprising a data port configured to receive data packets in accordance with a scheduling algorithm; and signal logic configured to while the data port is receiving data packets in accordance with the scheduling algorithm, generate a flow stop signal, wherein responsive to the flow stop signal being generated, the data port is configured to halt reception of data packets, and unconditionally generate a flow start signal subsequent to generating the flow stop signal, wherein responsive to the flow start signal being generated, (i) the scheduling algorithm is configured to be reset, and (ii) the data port is configured to resume reception of the data packets in accordance with the reset scheduling algorithm.

18 Claims, 2 Drawing Sheets

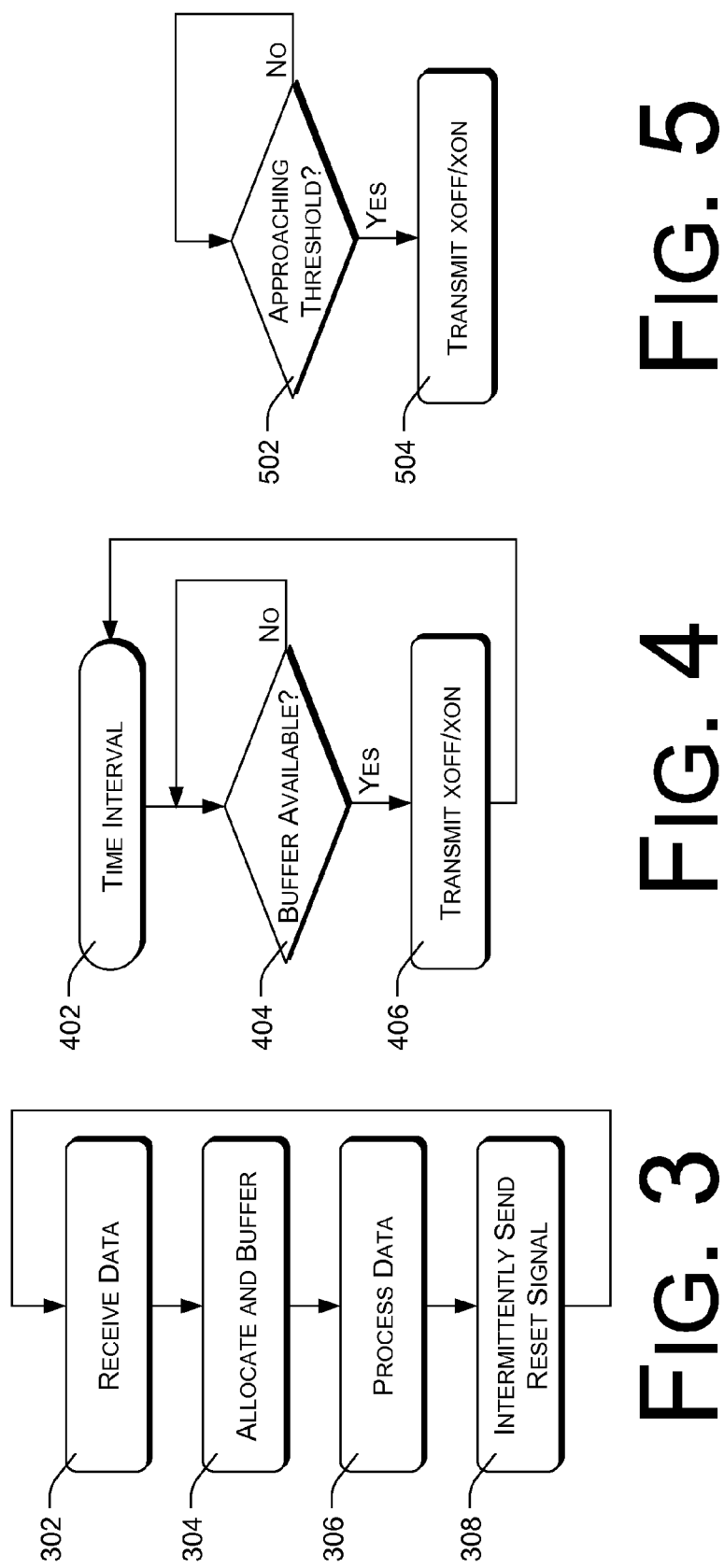

METHOD AND APPARATUS FOR PRIORITIZING DATA TRANSFER

CROSS-REFERENCE TO RELATED APPLICATION

The present disclosure claims priority to U.S. Provisional Patent Application 61/500,003, filed on Jun. 22, 2011, which is hereby incorporated herein by reference.

TECHNICAL FIELD

This disclosure relates to data communications, and more particularly to prioritizing certain data such as control data when using lossy communications protocols.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Data communications protocols can be generally classified as being either lossless or lossy. When using a lossless communications protocol, a transmitter transmits data only when a receiver has indicated readiness to receive the data. When using a lossy communications protocol, the transmitter transmits data without regard to the readiness of the receiver, and the receiver may ignore or discard data that the receiver is not ready to accept. In some cases, a consumer of the data may request retransmission of any such ignored or discarded data. In other cases, the data consumer may be able to proceed without the ignored or discarded data.

IP (Internet Protocol) is an example of a lossy communications protocol. IP is widely used for Internet and other network communications.

Lossy protocols such as IP may be advantageous in certain situations, such as in networks where data packets traverse a number of points on their way from an originating device to a consuming device. For example, if lossless protocols are used in this type of environment, congestion and delays at a single network point may be propagated to upstream network points. Lossy protocols, on the other hand, allow upstream network points to continue processing data regardless of the status of downstream network points, thereby preventing the upstream network points from becoming congested with data that must be held until downstream congestion is relieved.

Even in situations where lossy communications are tolerated or desired, there is often a need for certain data to be given high priority. As an example, high-priority control data may need to be transferred between components of a network communications device. To accommodate this need, transmitting devices may be configured with a number of transmission queues having different priorities.

There are various scheduling algorithms for determining which of multiple transmission queues will receive attention at any time. One common scheduling algorithm, referred to as strict priority, gives immediate attention to any data that is placed in a high-priority queue. When using strict priority, data from lower-priority queues is transmitted only if all higher priority queues are empty. A disadvantage of this algorithm is that situations may arise in which lower priority queues are never processed, due to continued presence of data in higher-priority queues.

Weighted round robin (WRR) is another scheduling algorithm, in which queues having different priorities are addressed in a sequence and data is transmitted in specified proportions from each queue. One implication of WRR is that sometimes (e.g., periodically) higher priority queues are ignored while lower priority queues are processed. Typically, queues are processed in descending order of priority, with each queue being processed exclusively until the desired proportion of data packets have been sent from that queue.

SUMMARY

In accordance with an embodiment, there is provided a network component, comprising a data port configured to receive data packets in accordance with a scheduling algorithm; and signal logic configured to while the data port is receiving data packets in accordance with the scheduling algorithm, generate a flow stop signal, wherein responsive to the flow stop signal being generated, the data port is configured to halt reception of data packets, and unconditionally generate a flow start signal subsequent to generating the flow stop signal, wherein responsive to the flow start signal being generated, (i) the scheduling algorithm is configured to be reset, and (ii) the data port is configured to resume reception of the data packets in accordance with the reset scheduling algorithm.

In accordance with an embodiment, there is also provided a method, comprising receiving data from a transmitter in accordance with a scheduling algorithm; processing the data; storing the data in a buffer prior to processing the data; and intermittently providing a priority reset signal to the transmitter at times when the buffer has at least a predefined amount of unused storage, wherein the priority reset signal is configured to facilitate halting transmission of data from the transmitter, and subsequent to facilitating halting the transmission of data from the transmitter, facilitate (i) resetting the scheduling algorithm and (ii) resuming transmission of data from the transmitter in accordance with the reset scheduling algorithm.

In accordance with an embodiment, there is also provided network component, comprising a data port configured to receive data in accordance with a scheduling algorithm; a limited capacity resource that is allocated based at least in part on the data; and signal logic configured to generate a priority reset signal at the data port at times when the limited capacity resource has available capacity, wherein the priority reset signal is configured to facilitate halting of the reception of data, and subsequent to facilitating halting the reception of data, facilitate (i) resetting the scheduling algorithm and (ii) based on resetting the scheduling algorithm, starting of reception of high-priority data by the network component.

BRIEF DESCRIPTION OF THE DRAWINGS

Embodiments of the present disclosure will be readily understood by the following detailed description in conjunction with the accompanying drawings. To facilitate this description, like reference numerals designate like structural elements.

FIG. 3 is a flow diagram illustrating a method performed by a receiver to manage high-priority data flow in accordance with the techniques described herein.

FIGS. 4 and 5 illustrate methods of generating a priority reset signal in accordance with the techniques described herein.

DETAILED DESCRIPTION OF EMBODIMENTS OF THE DISCLOSURE

Figure 1:
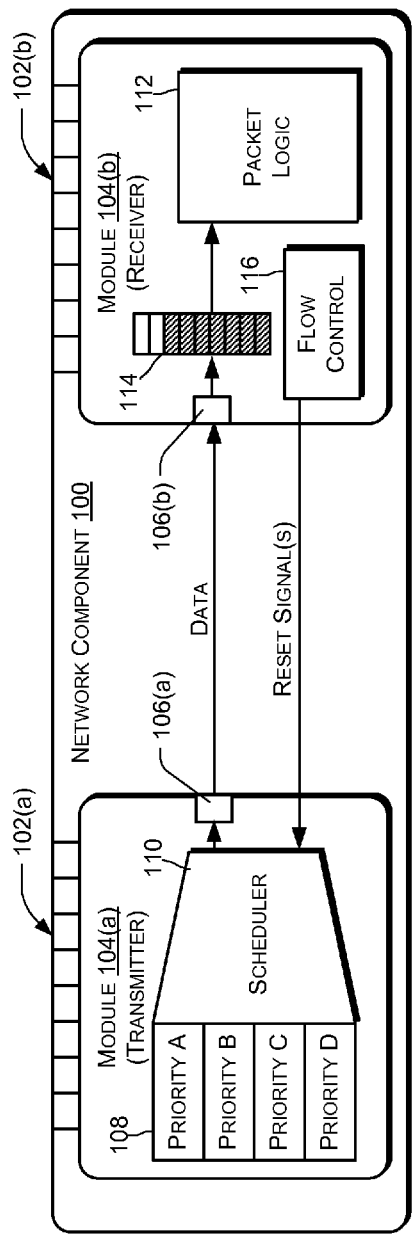
FIG. 1 is a block diagram showing a network device or component in which data communications may be prioritized.

FIG. 1 schematically illustrates a network component or device 100 in accordance with an embodiment of the present disclosure. The network component 100 is coupled to a network (not illustrated in FIG. 1). The network component 100 includes a plurality of external network ports (or interfaces) 102 (also referred to herein as "ports 102") configured to receive data packets from, or transmit data packets to the network. The ports 102 may comprise wired and/or wireless data communication ports. In some embodiments, the ports 102 may comprise Ethernet ports or connections.

In general, the network component 100 may comprise, for example, one of a network switch, a network router, a network port, an Ethernet port (e.g., a Gigabit Ethernet port), a network controller, a network bridge, an optical network terminal (ONT), and optical network unit (ONU), a packet processor, a network processor, a Serializer/Deserializer (SerDes), any appropriate device that has a network connectivity, and the like. Although FIG. 1 and this disclosure describe a network component or device, the network component 100 and/or its components may comprise or be included in a device that is not a network device. For example, the network component 100 and/or one or more components of the network component 100 may be included in a packet processing system that processes and stores data packets received from, for example, a memory, an optical disk, a disk drive, or other appropriate storage medium.

The network component 100 includes a plurality of modules 104 that communicate with each other. In the illustrated embodiment, such modules 104 comprise a first module 104(a) and a second module 104(b) (also referred to herein as "modules 104"). The first module 104(a) may be similar or identical to the second module 104(b), and each of the first module 104(a) and the second module 104(b) may comprise functional units or subsystems for performing functions such as network switching, routing, bridging, and other types of data handling and communications. Generally, each of the modules 104 receives data packets and retransmits the data packets to various ones of its ports in accordance with descriptors associated with the data packets.

In the illustrated embodiment, the modules 104 are in a "stacked" configuration, meaning that the functionality of the modules 104 is combined for purposes of using and managing the network component 100. Specifically, each of the modules 104 supports a subset of the network ports 102 (also referred to herein as "ports 102"): the first module 104(a) supports ports 102(a), and the second module 104(b) supports ports 102(b). As the ports 102(a), 102(b) are external to the respective modules 104(a), 104(b), the ports 102(a), 102(b) are also referred to herein as external ports. Each of the ports 102(a), 102(b) may include a plurality of ports, as illustrated in FIG. 1.

In addition to the external ports 102, the modules 104 may implement one or more internal network ports (e.g., which are internal to the respective module) for communications amongst themselves. For example, the first module 104(a) may implement an internal port 106(a) (also referred to herein as "port 106(a)"), and the second module 104(b) may implement an internal port 106(b) (also referred to herein as "port 106(b)"). These internal ports may be functionally identical to and indistinguishable from the external ports 102. Thus, the external ports 102 and the internal ports 106(a), 106(b) may comprise Ethernet communications ports, may utilize identical communications protocols, and may be supported by the same or similar logic. As the internal ports 102(a), 102(b) and the external ports 106(a), 106(b) receives and/or transmits data packets, these ports are also referred to as data ports.

In the following discussion, module functionality related to data transmission will be described with reference to the first module 104(a), which will also be referred to as the transmitter 104(a). Functionality related to data reception will be described with reference to the second module 104(b), which will also be referred to as the receiver 104(b). Note, however, each of the modules 104(a) and 104(b) may be capable of both transmitting and receiving, and communications through the ports 102 and 106 may be bidirectional. Thus, each of the modules 104(a), 104(b) may in some embodiments implement the same functionality: in addition to the functionality described, the transmitter 104(a) may implement the receiving functionality of the receiver 104(b), and the receiver 104(b) may implement the transmitting functionality of the transmitter 104(a).

In some embodiments each of the modules 104 may function as a standalone component or device. In certain embodiments, an individual network component or device 100 may have only a single module 104. Furthermore, in certain embodiments multiple instances of the network component 100 may be stacked or otherwise configured to operate in conjunction with each other to provide larger numbers of external communications ports 102. In these situations, the multiple instances of network components 100 may communicate with each other through the external ports 102 of the individual network components 100.

Turning now to the transmitting capabilities of the modules 104, the transmitter 104(a) has a plurality of transmit or transmission queues 108. The transmission queues 108 have different priorities, indicated as Priority A, Priority B, Priority C, and Priority D. It is assumed in this example that A has the highest priority, and that D has the lowest priority.

The transmitter 104(a) also has a scheduling logic 110, also referred to as a scheduler 110. In an embodiment, the scheduler 110 implements a weighted round-robin (WRR) priority scheme, so that a given proportion of data packets in the Priority A queue are transmitted first, followed by proportions of data packets from queues of descending priority: first A, then B, then C, then D, then back to A again, and so on. In another embodiment, the scheduler 110 implements a strict priority (SP) scheme, e.g., in which data packets in the Priority A queue are transmitted first, followed by data packets from queues of descending priority: first A, then B, then C, then D, then back to A again, and so on. In another embodiment, the scheduler 110 implements a WRR priority scheme for some priority queues, and implements a SP scheme for other queues. In yet another embodiment, the scheduler 110 implements any appropriate priority scheme (or a combination of more than one priority scheme) for various priority queues.

The scheduler 110 may also be responsive to flow control signals, such as flow stop signals (or XOFF signals) and flow start signals (or XON signals). For example, the scheduler 110 may respond to an XOFF signal by interrupting or halting data transmissions. The scheduler 110 may respond to an XON signal by initiating or resuming data transmissions. When resuming data transmissions in response to receiving an XON signal, the scheduler 110 will typically resume data transmissions beginning with the highest priority queue. In other words, the scheduler 110 will reset or restart the priority sequence of the WRR sequence.

With respect to the receiving capabilities of the modules 104, the receiver 104(*b*) includes packet logic 112 configured to process received data packets. For example, the packet logic 112 may route received data packets to appropriate ports 102(*b*) or 106(*b*). The receiver 104(*b*) also has a buffer 114 configured to temporarily store received data packets until the data packets have been processed by the packet logic 112. Occupied or used locations of the buffer 114 are illustrated in FIG. 1 as being shaded. Available or unused buffer locations are illustrated in FIG. 1 without shading.

As data packets are received, either from the external ports 102(*b*) or from the internal port 106(*b*), the data packets are written to the buffer 114 if the buffer 114 has sufficient available capacity. If the buffer 114 is full, received data packets are ignored or discarded. Thus, the receiver 104(*b*) implements a lossy communications protocol.

As buffered data packets are processed by the packet logic 112, they are removed from the buffer 114, making room for additional received data packets. As an example, a buffered data packet may be removed from the buffer 114 when the packet has been retransmitted to another device through one of the external ports 102(*b*).

The receiver 104(*b*) may include flow control logic 116, configured to intermittently generate a priority reset signal at one or more of the data ports, including the internal data port 106(*b*) and/or the external data ports 102(*b*). The priority reset signal may comprise one or more in-band signals, such as codes transmitted by the receiver 104(*b*) to the transmitter 104(*a*) through the internal ports 106. In some embodiments, the priority reset signal may be an out-of-band signal, such as a hardware-based signal communicated on or more dedicated signal lines. In the illustrated embodiment, the priority reset signal is transmitted from the receiver 104(*b*) to the transmitter 104(*a*). In general, the priority reset signal may be transmitted from any of the receiver ports, including the internal port 106(*b*) and/or the external ports 102(*b*).

In an embodiment, the priority reset signal may comprise a flow stop or XOFF signal, followed immediately and unconditionally by a flow start or XON signal. In an embodiment such as this, the flow control logic 116 is configured to intermittently generate a flow stop signal at certain times or after certain conditions are satisfied, and to unconditionally generate a flow start signal after generating the flow stop signal. In accordance with typical behavior of a WRR scheduler such as implemented by the transmitter 104(*a*), this causes the scheduler 110 to temporarily stop data transmissions, and then to quickly resume or initiate data transmissions beginning with data from highest priority queues.

Figure 2:
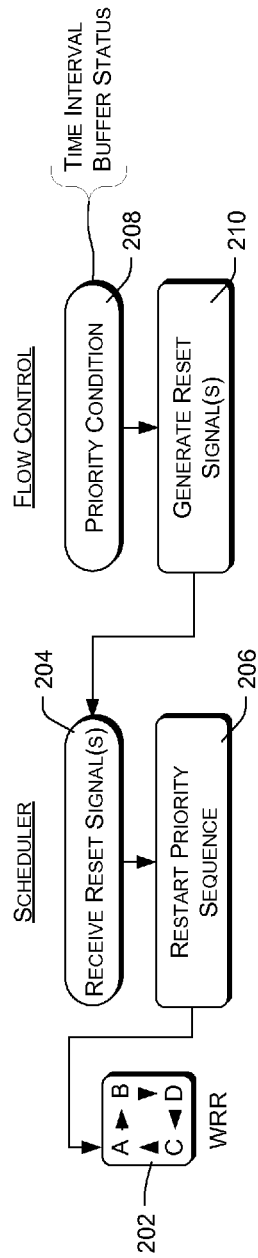
FIG. 2 is a flow diagram illustrating interaction between a transmitter and a receiver in accordance with the techniques described herein.

FIG. 2 illustrates example behaviors of the scheduler 110 and the flow control logic 116 in an embodiment. Actions on the left side of FIG. 2 are performed by the scheduler 110. Actions on the right side of FIG. 2 are performed by the flow control logic 116.

The scheduler 110 implements a weighted round robin (WRR) priority scheme 202, in which the A, B, C, and D transmission queues 108 are addressed to in sequence, starting with the highest priority queue.

The scheduler 110 is configured to receive and respond to a priority reset signal, which may comprise one or more flow control signals as described above. At 204, the scheduler receives one or more such flow control signals. For example, the scheduler may receive a flow stop signal, also referred to as a transmit-off or XOFF signal; followed by a flow start signal, also referred to as a transmit-on or XON signal. Upon receiving the priority reset signal, the scheduler performs an action 206, which comprises restarting the WRR priority sequence.

More specifically, upon receiving an XOFF signal, the scheduler 110 interrupts or stops data transmissions from the transmit queues 108. Upon receiving an XON signal, the scheduler 110 starts or resumes data transmissions, beginning with the high-priority queue A, and then proceeding with lower priority queues in turn.

Turning now to the right side of FIG. 2, the flow control logic 116 is responsive to a priority condition 208 to generate the priority reset signal. More specifically, in response to a priority condition 208, the flow control logic performs an action 210, which comprises generating priority reset signal described above. Generating the priority reset signal has the effect of restarting or resetting the priority sequence 202 used by the scheduler 110.

The priority condition 208 may be time-based and/or based on the current status or unused capacity of the buffer 114 of the receiver 104(*b*). For example, the priority condition 208 may be an event that occurs intermittently, at regular, irregular, or random intervals. Alternatively the priority condition 208 may relate strictly to the status of the buffer 114. For example, the priority condition 208 may be defined as the situation in which the buffer is approaching or nearing full capacity, but has not yet reached full capacity.

The priority reset signal generated at the action 210 may comprise an XOFF signal followed quickly or immediately by an XON signal. This has the effect of resetting the WRR priority scheme 202, without significantly interrupting actual data transmission.

In an embodiment, flow control signals such as XON and XOFF signals are not used to prevent overflow or overrun of the buffer 114. Rather, the flow control signals are generated prior to buffer overflow or at other times when the buffer has unused or available capacity, in order to initiate transmission of high-priority data from the transmitter 104(*a*) prior to overflow conditions. Between each generation of the flow control signals, the buffer 114 may be allowed to overflow. In most cases, any data that is discarded as a result of such an overflow will comprise data of relatively low priority.

More specifically, generation of the flow control signals by the receiver may be limited to those times when the buffer 114 has at least a predefined amount of unused capacity. Stated alternatively, the flow control logic 116 may be configured to forgo generation of the flow control signals at times when the buffer 114 is full or nearly full. For example, flow control signals may be disabled or inhibited at times when the buffer 114 does not have at least a predefined amount of available or unused capacity, or at times when the available capacity of the buffer is less than a low capacity threshold. Such a low capacity threshold may be predefined based on expected sizes or volumes of high-priority data. For example, the low capacity threshold may be set to a value large enough to accommodate periodic reception of expected amounts of high-priority data.

In addition to disabling generation of the flow control signals when the buffer 114 is full or nearly full, the flow control logic 116 may be configured to proactively generate the flow control signals at times when the available capacity of the buffer is nearing or approaching the low capacity threshold. As the buffer 114 is filling, for example, the flow control logic 116 may detect that the unused capacity of the buffer 114 has been reduced to a level that is nearing the low capacity threshold, and may proactively transmit the flow control signals to prompt the transmission of high-priority data while the buffer 114 still has available capacity.

FIG. 3 illustrates an example of actions that may be performed by the receiver 104(b). An action 302 comprises receiving data or data packets from the transmitter 104(a). An action 304 comprises allocating buffer storage for the received data, and storing or buffering the received data in the allocated storage. Generally, the action 304 may comprise any allocation of a limited capacity resource that is based at least in part on received data.

An action 306 comprises processing the received data. This may involve various types of operations, depending on the specific nature of the network component 100. For example, the processing 306 may comprise routing the received data to a particular data port.

An action 308 comprises intermittently sending or providing a priority reset signal. The priority reset signal may comprise an in-band flow stop or XOFF signal, followed unconditionally by an in-band flow start or XON signal. Alternatively, the priority reset signal may comprise an out-of-band or hardware-based signal.

The actions of FIG. 3 are performed repetitively. In many embodiments, the actions illustrated by FIG. 3 are performed concurrently.

FIG. 4 illustrates an example method that may be used in an embodiment to generate the priority reset signal, which in this example comprises an XON command followed unconditionally by an XOFF command. An interval timer may repetitively indicate expiration of a time interval 402. The time interval 402 may be regular, periodic, irregular, or random. In response to the time interval 402, the flow control logic at 404 determines whether there is at least a predefined amount of buffer storage available. This may be performed by comparing current buffer usage to a predetermined threshold. If current buffer usage does not exceed the threshold, indicating a sufficient amount of remaining buffer capacity, the method at 406 generates an XOFF/XON signal as described above, and the actions of FIG. 4 are repeated. If current buffer usage exceeds the threshold, however, indicating a relatively small amount of remaining buffer capacity, the method loops or waits at 404 until there is increased buffer availability.

Receiving the XON/XOFF signal causes the scheduler 110 to reset the WRR priority sequence used by the transmitter 104(a), so that the highest priority queue (queue A in this example), is given immediate attention, and one or more data packets from the high-priority queue are transmitted next from the transmitter 104(a).

FIG. 5 illustrates another example method that may be used in an embodiment to generate the priority reset signal. In this example, an action 502 comprises determining whether available buffer capacity is approaching a low capacity threshold. If the available buffer capacity is approaching the low capacity threshold, such as when the buffer is becoming nearly full, an action 504 is performed, comprising transmitting the XOFF/XON signal. Otherwise, if the available buffer capacity is not approaching the threshold, the action 502 is repeated. Note that the method of FIG. 5 may be used in combination with the method of FIG. 4.

The described techniques increase the chances that certain types of data traffic will not be discarded or lost, even when using a lossy communications protocol. In the situation illustrated by FIG. 1, for example, there may be a relatively small amount of control data that is passed between modules of the network component 100. Assuming that such control data is placed in a high priority queue by the transmitter 104(a), the described techniques cause the control data to be transmitted at times when the receiver 104(b) has sufficient capacity to process the control data. The benefits of lossy data transmission may nevertheless be obtained, because no significant waits or delays are forced upon the transmitter 104(a).

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A network component, comprising:
    a data port configured to receive data packets in accordance with a scheduling algorithm; and
    signal logic configured to
        while the data port is receiving data packets in accordance with the scheduling algorithm, generate a flow stop signal, wherein responsive to the flow stop signal being generated, the data port is configured to halt reception of data packets,
        unconditionally generate a flow start signal subsequent to generating the flow stop signal, wherein responsive to the flow start signal being generated, (i) the scheduling algorithm is configured to be reset, and (ii) the data port is configured to resume reception of the data packets in accordance with the reset scheduling algorithm, and
        forgo generating the flow stop signal and the flow start signal at times when available capacity of a buffer is less than a low capacity threshold.

2. The network component of claim 1, further comprising:
packet logic configured to process the data packets; and
a buffer configured to temporarily store the data packets until they have been processed by the packet logic.

3. The network component of claim 1, further comprising:
packet logic configured to process the data packets; and
a buffer configured to temporarily store the data packets until they have been processed by the packet logic,
wherein the signal logic is further configured to generate the flow stop signal and the flow start signal at times when the available capacity of the buffer is nearing a low capacity threshold.

4. The network component of claim 1, wherein the signal logic is further configured to generate the flow stop signal and the flow start signal at periodic times or at random times.

5. The network component of claim 1, wherein responsive to the flow start signal being generated, transmission of high-priority data packets to the network component is initiated.

6. The network component of claim 1, wherein data packets are discarded when the buffer is full.

7. The network component of claim 1, further comprising:
a plurality of transmit queues; and
a data transmission scheduler configured to implement a weighted round robin prioritization scheme with respect to the transmit queues.

8. The network component of claim 1, further comprising:
a plurality of transmit queues; and
a data transmission scheduler configured to (i) implement a weighted round robin prioritization scheme with respect to the transmit queues, and (ii) restart the weighted round robin prioritization scheme in response to a received flow start signal.

9. A method, comprising:
receiving data from a transmitter in accordance with a scheduling algorithm;
processing the data;
storing the data in a buffer prior to processing the data; and
intermittently providing a priority reset signal to the transmitter at times when the buffer has at least a predefined amount of unused storage, wherein the priority reset signal is configured to
 facilitate halting transmission of data from the transmitter, and
 subsequent to facilitating halting the transmission of data from the transmitter, facilitate (i) resetting the scheduling algorithm and (ii) resuming transmission of data from the transmitter in accordance with the reset scheduling algorithm; and
forgoing providing the priority reset signal at times when available capacity of the buffer is less than a low capacity threshold.

10. The method of claim 9, wherein the priority reset signal comprises one or more in-band flow control signals.

11. The method of claim 9, wherein the priority reset signal comprises an in-band flow stop signal followed unconditionally by an in-band flow start signal.

12. The method of claim 9, wherein the priority reset signal comprises an out-of-band signal.

13. The method of claim 9, wherein intermittently providing the priority reset signal comprises providing the priority reset signal at periodic intervals.

14. The method of claim 9, wherein intermittently providing the priority reset signal is performed in response to availability of the buffer.

15. A network component, comprising:
a data port configured to receive data in accordance with a scheduling algorithm;
a limited capacity resource that is allocated based at least in part on the data; and
signal logic configured to generate a priority reset signal at the data port at times when the limited capacity resource has available capacity, wherein the priority reset signal is configured to
 facilitate halting of the reception of data, and
 subsequent to facilitating halting the reception of data, facilitate (i) resetting the scheduling algorithm and (ii) based on resetting the scheduling algorithm, starting reception of high-priority data by the network component, and
forgo generating the priority reset signal at times when available capacity of the limited capacity resource is less than a low capacity threshold.

16. The network component of claim 15, wherein the priority reset signal comprises one or more in-band flow control signals.

17. The network component of claim 15, wherein the priority reset signal comprises a flow stop signal followed unconditionally by a flow start signal.

18. The network component of claim 15, wherein the limited capacity resource comprises a data buffer.

* * * * *